Feb. 20, 1951 J. R. BAYSTON 2,542,892
MACHINE FOR MANUFACTURING ICE
Filed Oct. 1, 1947 7 Sheets-Sheet 1

Inventor:
John R. Bayston
By Clarence J. Loftus Atty.

Feb. 20, 1951 J. R. BAYSTON 2,542,892
MACHINE FOR MANUFACTURING ICE
Filed Oct. 1, 1947 7 Sheets-Sheet 3

Inventor,
John R. Bayston
By Clarence J. Loftus atty.

Feb. 20, 1951 J. R. BAYSTON 2,542,892
MACHINE FOR MANUFACTURING ICE
Filed Oct. 1, 1947 7 Sheets-Sheet 5

Inventor
John R. Bayston
By Clarence J. Loftus, atty.

Feb. 20, 1951  J. R. BAYSTON  2,542,892
MACHINE FOR MANUFACTURING ICE
Filed Oct. 1, 1947  7 Sheets-Sheet 6

Fig. 13

Inventor:
John R. Bayston
By Clarence J. Loftus atty.

Patented Feb. 20, 1951

2,542,892

UNITED STATES PATENT OFFICE 2,542,892

MACHINE FOR MANUFACTURING ICE

John R. Bayston, Chicago, Ill., assignor, by mesne assignments, to Icecrafter Trust, a trust comprised of John R. Bayston, Van Nuys, and Bernidine B. Oliver, North Hollywood, Calif., and Ward M. Vanderpool, Rockford, Ill., trustees Application October 1, 1947, Serial No. 777,133

8 Claims. (Cl. 62—106)

The present invention relates to a machine for manufacturing ice, and particularly adapted to produce clear sparkling ice from untreated and unfiltered water, and to produce carbonated ice, or ice charged with other gasses and/or syrups, flavoring or color fluid. In addition, the invention contemplates a machine well suited to practice of the method, capable of continuously freezing small cakes of ice suitable for individual beverage portions and designed to release the ice from the freezing cells automatically.

One of the principal objects of the invention resides in the provision of a novel machine for freezing ice whereby water is maintained in a condition of active flow in a thin film across the freezing surfaces, so that the ice is formed as a progressively increasing deposit and is entirely clear and free from the cloudy appearance ordinarily encountered in ice produced by previously known methods.

A further object of the present invention is to provide a machine for freezing ice to produce an ice charged with a gas, as for example, an oxygenated or carbonated ice. This is particularly advantageous in ice intended for cooling carbonated beverages, since it not only prevents the melting of the ice in a beverage from diluting it and thus reducing its carbonation, but, in addition, means that the melting of the ice will release sufficient carbon dioxide gas into the surrounding liquid to preserve or even increase the degree of carbonation in the beverage.

A further object of the invention resides in the provision of a novel automatic machine adapted to automatically produce ice in individual portions of a size suitable for beverage use.

A still further object of the invention resides in the provision of an ice making machine having a novel construction and arrangement of parts whereby all of the water used by the machine is converted into ice so that there is no waste of water, yet whereby the individual portions of ice are automatically and repeatedly frozen, released from their freezing cells, and discharged through an outlet chute of the machine.

A still further object of the invention resides in the provision of an ice making machine utilizing inverted freezing cells with shiftable closure members adapted to close the bottoms of each cell so that ice can be frozen in the cell, but with means for automatically opening the bottom of the cell, heating the cell to free the ice from the cell walls, and allowing the ice to fall from the cell by gravity.

A further object of the invention resides in the provision of an improved automatic ice making machine having means for freezing individual portions of ice and automatically releasing them from the freezing cells by the utilization of waste heat from the refrigerating system of the machine.

In introduction it may be stated that although it has long been recognized that perfectly clear, sparkling ice is much to be preferred for any use and is particularly desirable in the case of individual ice portions intended for cooling beverages, yet the practical problems of designing a satisfactory machine for producing this product have heretofore been sufficiently great that users have felt compelled to be satisfied with ordinary freezing methods that result in a cloudy or porous cube. The present machine is a direct departure from machines heretofore employed, since instead of providing a tray with a limited quantity of liquid and refrigerating the entire body of the liquid, the invention contemplates the provision of a water reservoir and a multiplicity of individual freezing cells, with means for circulating the water in repeated cycles throughout the cells and injecting the water into each cell in a manner to flow a thin film of water across the freezing surfaces. The individual ice portions are built up from a thin film deposit that does not have the usual tendency to become cloudy or to expand against the walls of the freezing cell, and the product can thus be entirely clear.

The invention also contemplates the manufacture of ice charged with a gas as, for instance, a carbonated or oxygenated ice. To this end the invention contemplates the introduction of gas under pressure into the water reservoir. It has been learned that the recirculation of the water again and again throughout the gas charged reservoir and alternately through a pump to the freezing cells and across the refrigerated surfaces results in a very high absorption of gas in the liquid so that the ice, when frozen, contains a very substantial amount of gas that will be released on thawing. The degree of absorption of gas by the water may be further increased by maintaining the entire system under a pressure substantially above atmospheric pressure, and this expedient is used to produce highly carbonated ice.

Referring now more particularly to the drawings attached to and forming a part of the present specification.

Figure 14 is a schematic diagram of the machine similar to Figure 13 but showing the several parts in opposite positions.

The machine is housed in a cabinet 15 which is preferably of sheet metal construction and is mounted on a base plate 16. The cabinet includes internal frame members 17 adapted to support the various mechanical parts of the device and is provided with louvers 18 at each end to permit a flow of air through the cooling coils of the refrigerating mechanism.

The essential mechanism of the machine includes a pair of freezing units, each of which has a plurality of individual freezing cells, together with a refrigerating system and means to alternately connect the freezing units into the evaporator circuit of the system or into its condensing circuit, to freeze ice in one of the units while warming the other unit to release the ice. The cycle is then reversed by automatic timing means controlling the flow of the refrigerant, and mechanisms are provided to open and close the freezing cells and to supply them with water as required.

The freezing cells of the machine are formed in two sets, the right and left sets comprising separate but identical freezing units generally indicated by the ordinals 19 and 19' respectively. The freezing units 19 and 19' are carried on the frame members 17 by mounting bolts 21 and 21', and each unit includes a line of inverted freezing cells 22 and 22' having side walls 23 and 23' tapering somewhat inwardly and curving into downwardly extending points 24 and 24' at the top of the cells, so that water injected in a fine stream from the bottom of the cell is spread equally around their circumference and flows downwardly over the wall surfaces in a thin film. The freezing units include refrigerant chambers 25 and 25' between the walls of the individual cells and the outer wall surfaces 26, 26'. These chambers are adapted to receive cold refrigerant from the evaporator circuit of the system through the passages 27 and 27' and discharge it into the passages 28 and 28' during their freezing cycle, or to admit hot refrigerant from the condenser circuit through the passages 27 and 27' during the thawing cycle. The outer surfaces of each of the freezing units may be insulated, as by the insulating layers 29 and 29'.

Figures 1, 2:
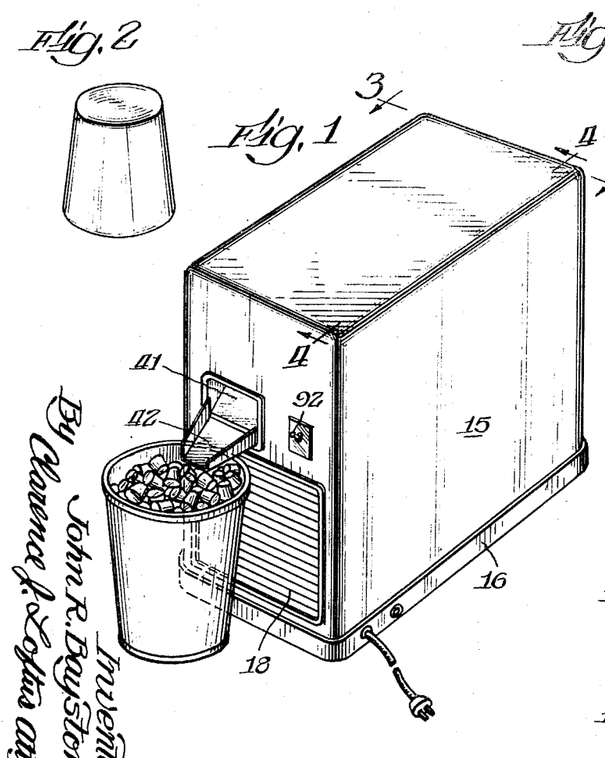
Figure 1 is a perspective view of an ice making machine constructed in accordance with the teachings of this invention.
Figure 2 is a perspective view of one of the individual cakes of ice as manufactured by the machine.
Figure 3:
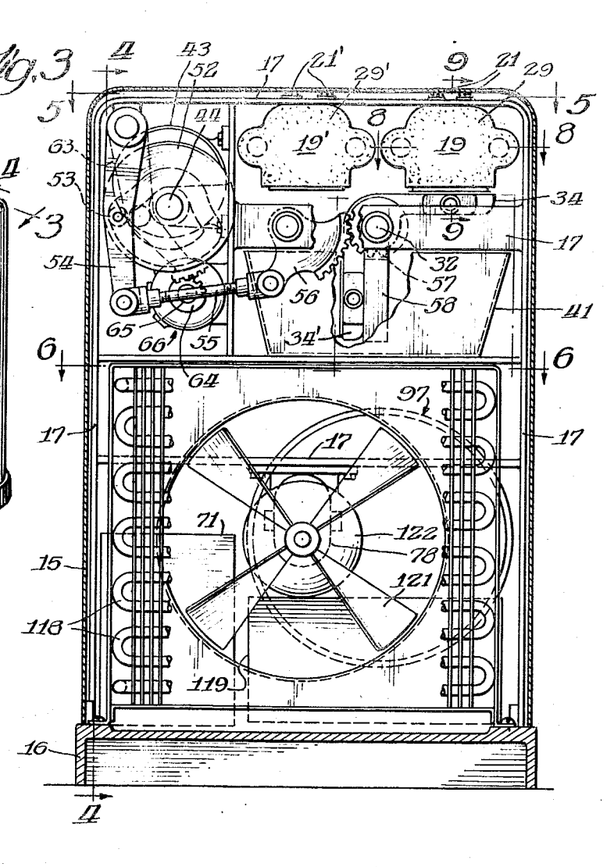
Figure 3 is a sectional elevation taken substantially on the plane of the line 3—3 of Figure 1.
Figure 4:
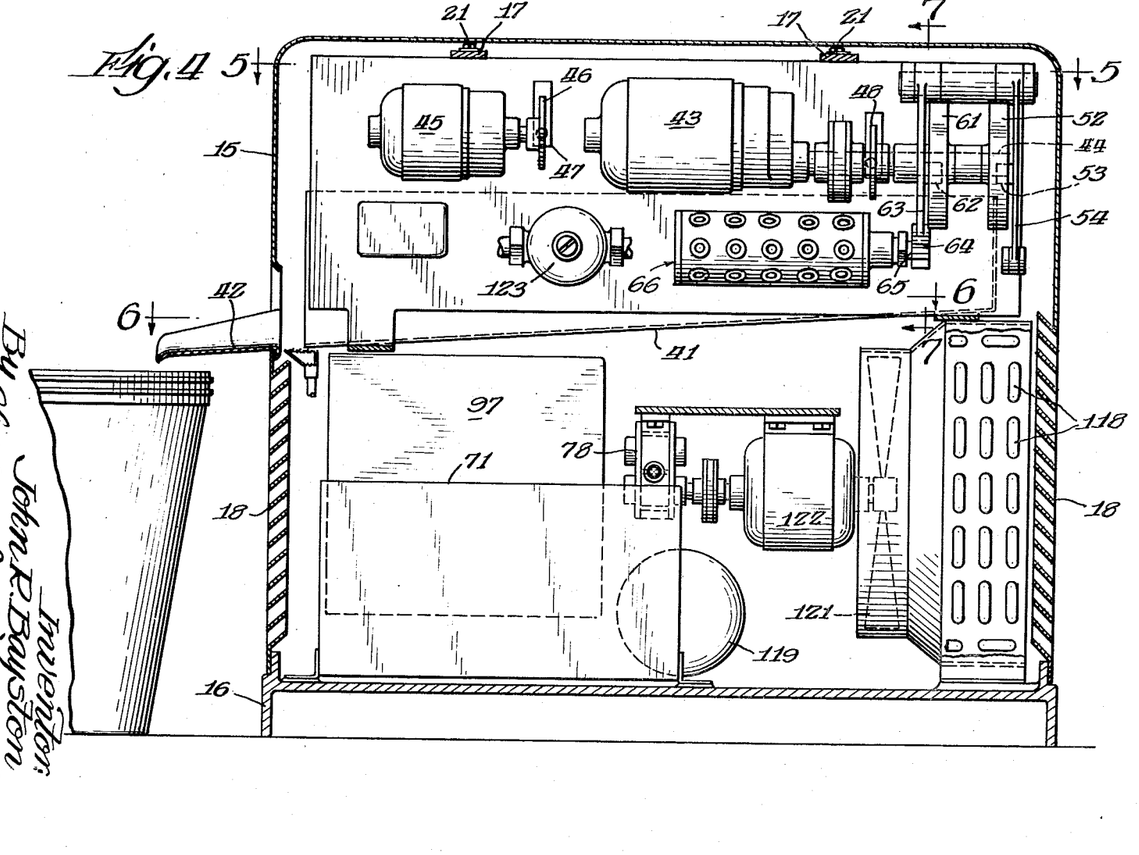
Figure 4 is a longitudinal sectional view taken substantially on the plane of the line 4—4 of Figures 1 and 3.
Figure 5:
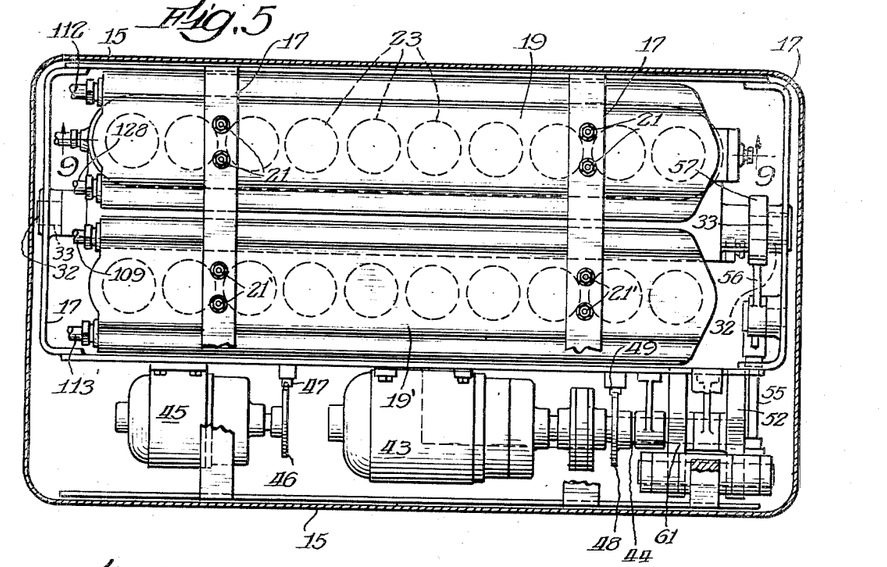
Figure 5 is a plan sectional view taken substantially on the plane of the line 5—5 of Figures 3 and 4.
Figure 6:
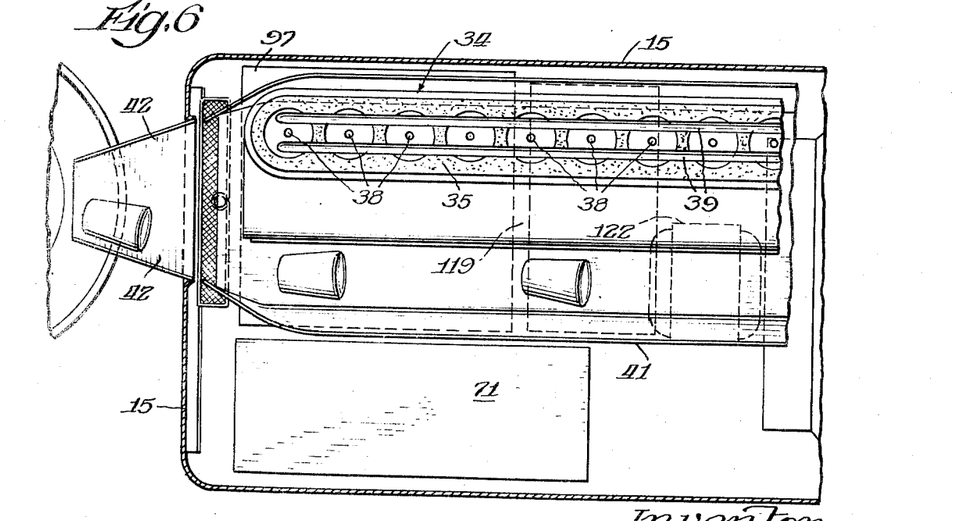
Figure 6 is a fragmental plan sectional view taken substantially on the plane of the line 6—6 of Figures 3 and 4.
Figure 7:
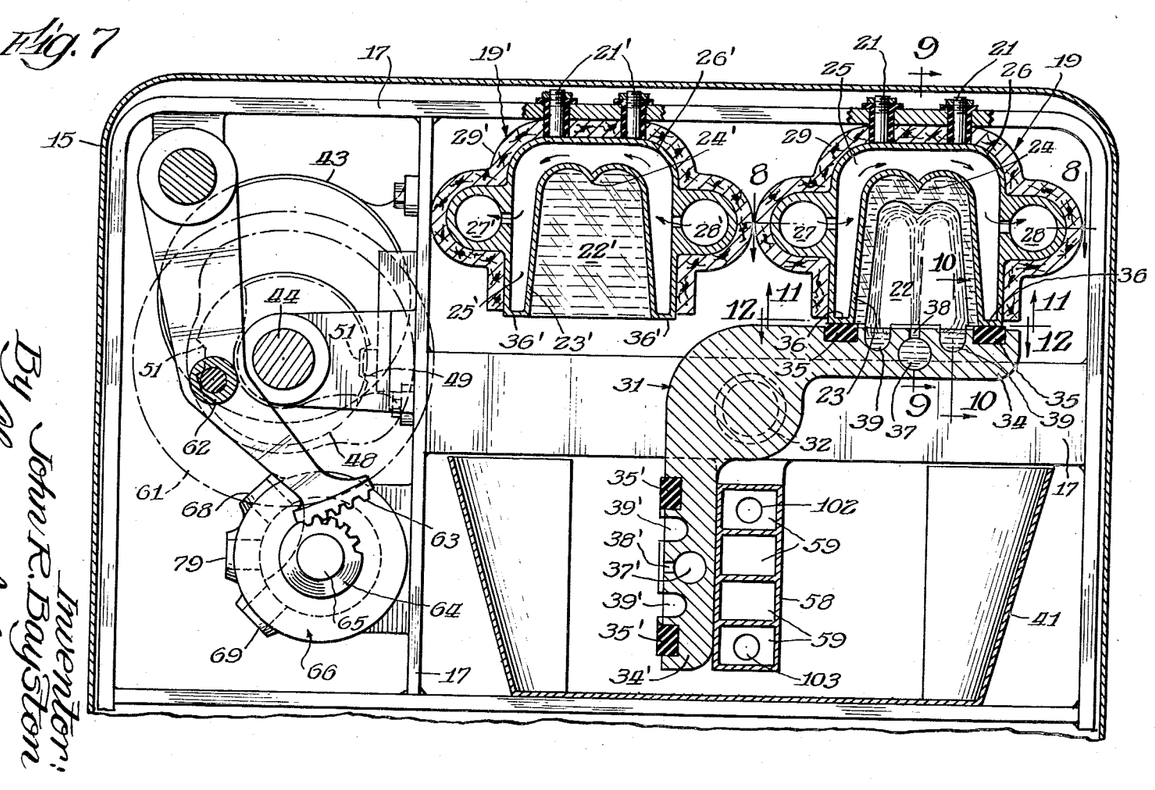
Figure 7 is an enlarged sectional view through the freezing units, and is taken substantially on the plane of the line 7—7 of Figure 4.
Figure 8:
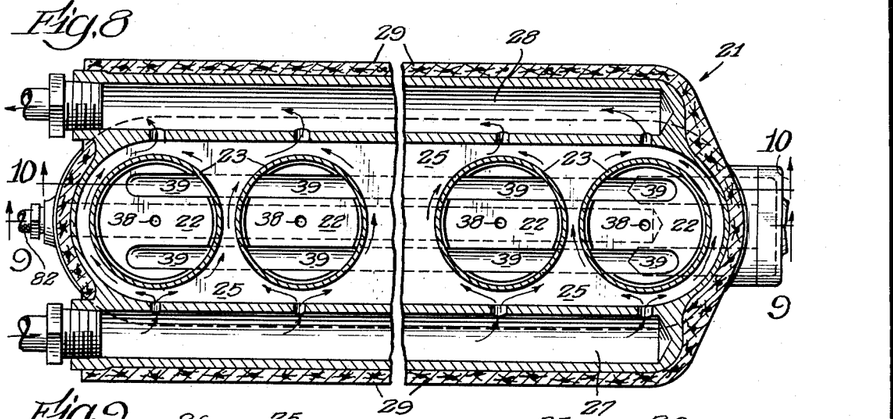
Figure 8 is a detail plan sectional view through one of the freezing units, taken substantially on the plane of the line 8—8 of Figures 3 and 7.
Figure 9:
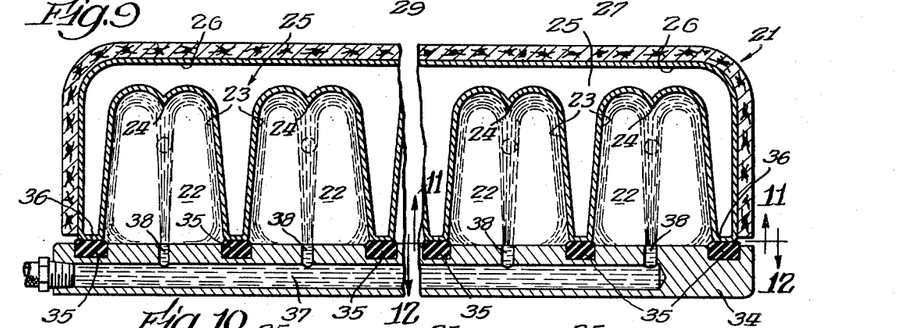
Figure 9 is a vertical sectional view through one of the freezing units, taken substantially on the plane of the line 9—9 of Figures 3, 5, 7, and 8.
Figures 10, 11, 12:
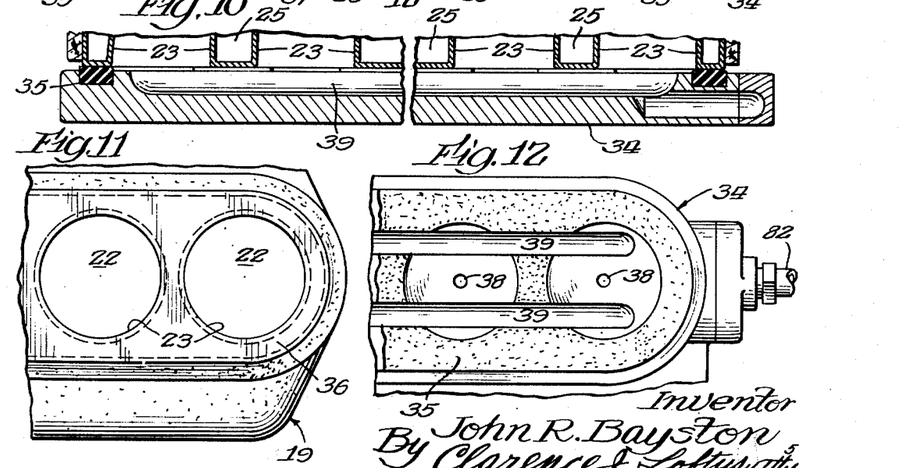
Figure 10 is a fragmental detail sectional view taken substantially on the plane of the line 10—10 of Figures 7 and 8.
Figure 11 is a fragmental bottom plan view of one of the freezing units, taken substantially on the plane of the line 11—11 of Figure 9.
Figure 12 is a fragmental plan view of the closure element for the freezing cells taken substantially on the plane of the line 12—12 of Figure 9.
Figure 11:
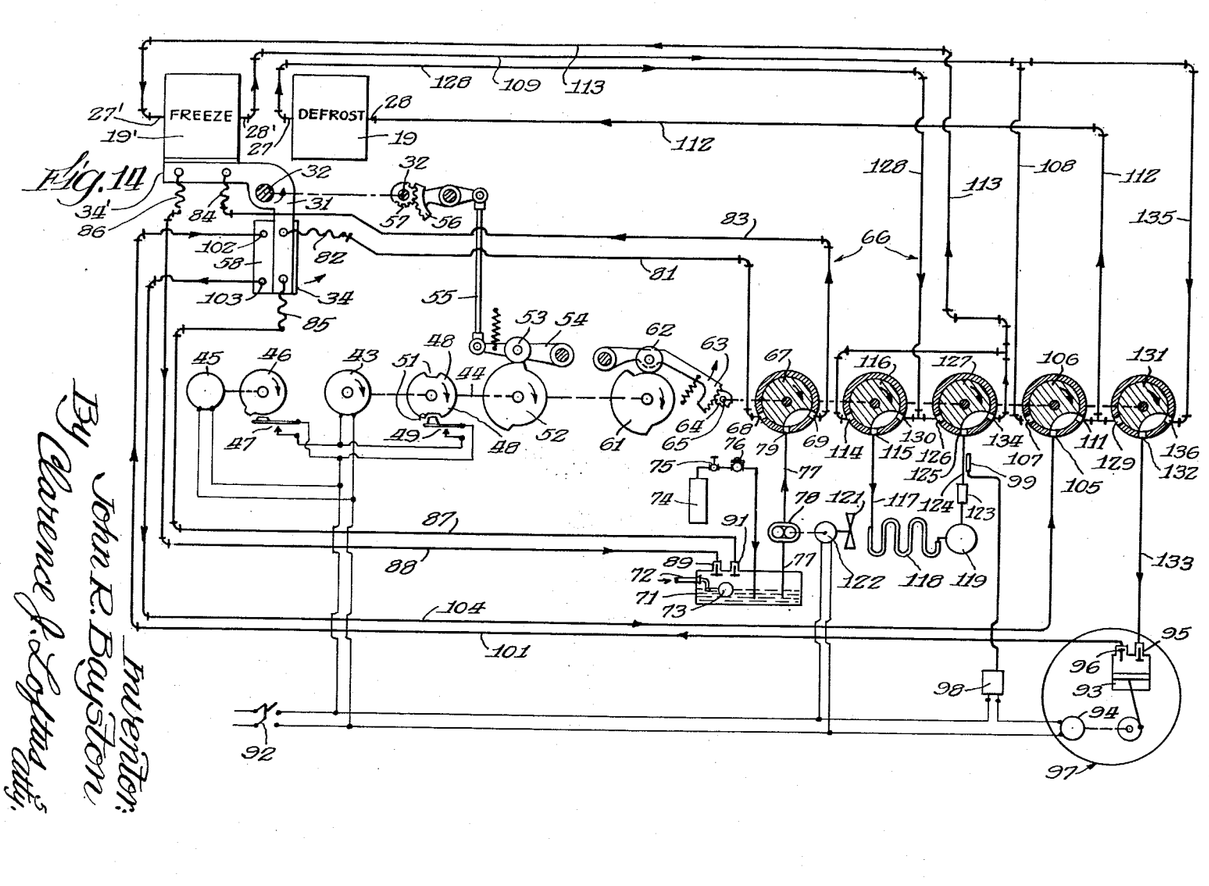

The freezing units 19 and 19' thus each consist of an ice making machine comprising a long row of individual cells of a size suitable for producing small cakes of ice for beverage purposes. The individual cells are open at the bottom, so that when full of ice the cells can be heated enough to release the cakes of ice and permit them to fall from the cells by gravity. It is obviously necessary, however, to provide means to close and seal the bottom of each of these cells during the freezing operation, and to this end a closure member 31 is pivoted on trunnions 32 rotatable in bearings 33 in the frame elements 17 (Figure 5). The closure member 31 includes a pair of outwardly extending plates 34 and 34', provided with thick, resilient gaskets 35, 35' to engage the bottom sealing surfaces 36 and 36' of the two freezing units and form a water-tight joint. Water inlet passageways 37 and 37' in the plate 34 and 34' connect with a series of vertical ports 38, 38' in the center of each of the individual cells, so that water injected upwardly through the ports 38 will strike the points 24, 24' at the top surfaces of the cells and be spread in a thin film extending around the top surfaces and downwardly along the sides of the cell walls. Drain channels 39 and 39' are formed in the plates to carry off surplus water. The shape of the closure member 31 causes the opposite plates 34 and 34' to lie at right angles to each other, so that they may be rocked back and forth to alternately close the cells in one of the freezing units and open the cells of the other.

In operation, the closed freezing cells are supplied with water and with cold refrigerant from the evaporator circuit of the refrigerating system, but when the freezing is completed in one set of cells the member 31 is rocked to the opposite position to open the cells containing ice and close the opposite side. As the cells on the opposite side are frozen, the unit having the ice-filled cells is connected into the condenser circuit of the refrigerating system so that hot refrigerant is passed through the chamber surrounding the cells until the cells are heated sufficiently to release the individual cakes of ice from the cell walls. As the cakes of ice free themselves from the cells, they fall out of the freezing units into the tray 41 and slide down the inclined bottom of the tray to a delivery chute 42 extending out of the machine.

Figure 13:
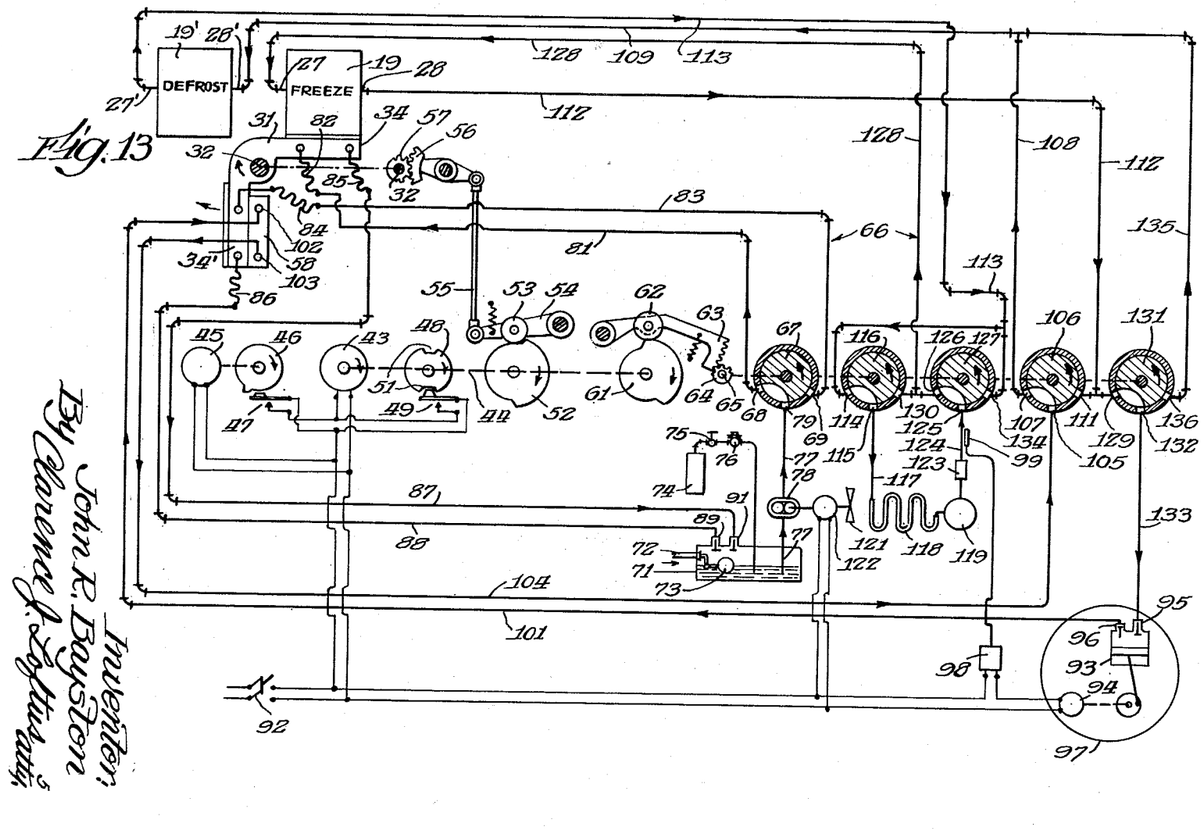
Figure 13 is a schematic diagram of the machine in one position of its operating cycle.

The closure member 31 is periodically shifted back and forth to hold one set of cells closed a sufficient time for freezing, and then open the frozen cells to allow the ice to be discharged therefrom while closing the opposite unit for its freezing cycle. To this end, a power operating mechanism is provided for the closure, with a cam actuated circuit breaker to stop the closure member at the proper point and a timing unit arranged to control the time of the cycle. The mechanism shown includes an electric motor 43 with an internal speed reduction mechanism driving a main cam shaft 44. The electrical circuit to the motor 43, best shown in Figures 13 and 14, is controlled by a small timing motor 45 and cam 46 set to periodically close the contacts 47 at time intervals sufficient to permit complete freezing of one unit. The contacts 47 complete the circuit through the drive motor 43, but need only maintain it until the cam shaft 44 begins to rotate, since a holding cam 48 is arranged to close the contacts 49 in parallel with the contacts 47. The contacts 47 complete a holding circuit through the motor 43, and since the holding cam 48 has two notches 51, spaced 180° apart, the drive motor 43 will run through exactly one-half of a revolution and stop only when the notch 51 permits the contacts 49 to open.

The cam shaft also carries a closure operating cam 52, which acts through the cam follower 53, lever 54, tie rod 55, and segmental gear 56 to rotate a pinion 57 secured to one of the trunnions 32 of the closure member 31 and thus shift the closure plates 34 and 34' through 90° of movement to their opposite position. This movement of the closure plates opens the cells of one of the freezing units preparatory to warming it to release the ice, and simultaneously closes the bottoms of the cells in the opposite unit to prepare it for freezing. The rocking motion of the closure member 31 also brings the plates 34 and 34' alternately against a heater 58 having an internal chamber 59 with hot refrigerating gas therein, and having suitable baffles to direct the circulation of the fluid along the full length of the heater, so that the surfaces of the closure plates are kept free of any unwanted accumulation of ice.

The operation of the machine also requires that when one unit is opened and the other closed for freezing that the connections of the water supply and refrigerant supply be changed accordingly. To this end the cam shaft 44 includes a valve operating cam 61, whose cam follower 62 moves a segmental gear 63 in mesh with a pinion 64 on the stem 65 of a multiple valve 66. The valve 66 actually consists of five separate two-way valves on a common stem, with the valve rotor 67 arranged to control the flow of water through the ports 68 and 69 to the units 19 and 19' respectively while the other rotors comprise a set of reversing values to control the flow of refrigerant.

Water is supplied to the cells from a water reservoir 71, which may be a closed tank having a connection to a high pressure water supply line 72, with a float valve 73 to maintain a predetermined water level within the tank. In machines operating at atmospheric pressure the tank 71 may be vented, but when the device is used to produce carbonated ice, or ice charged with other gasses, a compressed gas cylinder 74 is connected to the reservoir through a shut-off valve 75 and reducing valve 76. Water is drawn from the reservoir through a supply pipe 77 extending to a water pump 78 and thence to the port 79 of the multiple valve 66. The rotor 67 of the multiple valve is shiftable to connect the supply line 77 either with a port 68 leading through a water line 81 and flexible hose 82 to the water inlet passageway 37 on the plate 34 of the closure member 31 or to the port 69 leading through a water line 83 and flexible hose 84 to the inlet passageway 37' on the opposite plate 34'.

The drain channels 39 and 39' of the closure plates 34 and 34' extend through flexible hose connections 85 and 86 respectively to water return lines 87 and 88, each of which connects with the reservoir 71 through one of the check valves 89 and 91.

The refrigerating system of the machine includes a compressor 93 driven by a motor 94 and having an inlet of suction port 95 and outlet port 96. These mechanisms may be of any suitable type, and are accordingly illustrated as being of the sealed unit type, enclosed within the housing 97. The motor circuit of the compressor extends from the main switch 92 through a thermostatic switch 98, controlled by a conventional temperature responsive bulb 99 located at a suitable point of the evaporator circuit of the system. The refrigeration system outside of the sealed compressor unit includes a condenser circuit in which hot refrigerant from the compressor is passed through cooling coils to a liquid receiver, an expansion valve, and an evaporator circuit in which the refrigerant is permitted to vaporize in the freezing units to cool the water in the cells. A set of reversing valves are provided, however, so that hot refrigerant from the condenser circuit can be passed through the heater 58 and around the cells to release the cakes of ice. The refrigerating system is best shown in Figures 13 and 14, where it will be seen that the hot gas leaving the outlet port 96 of the compressor 93 is fed through the line 101 to the inlet port 102 of the heater 58. The fluid is directed in a circuitous path in the chambers 59, and passes outwardly through the port 103 and return line 104 to the center port 105 of the gang valve rotor 106. The rotor 106 directs the refrigerant either to the port 107 and thence through the lines 108 and 109 to the passage 28' of the freezing unit 19', or, when in its other position, through the port 111 and line 112 to the passageway 28 of the freezing unit 19. The hot gas entering the unit 19' passes through the refrigerant chamber 25' and leaves the unit through the passageway 27', from which it flows back through the line 113 to the gang valve, and through the port 114, rotor 116, and the port 115 to the line 117 and thence into the condenser coils 118 and liquid receiver 119. The coils 118 are cooled by a fan 121 having a driving motor 112, which may also drive the water pump 78 heretofore described.

The evaporator circuit of the refrigerating system begins at the liquid receiver 119 and extends through the freezing units and back to the compressor 93. The cooled refrigerant from the receiver 119 flows through an expansion valve 123, past the bulb 99 of the thermostatic switch 98 and through a line 124 leading to an inlet port 125 in the multiple valve 66. The fluid flows through the valve rotor 127 either to the port 126 and thence through the line 128 to the passageway 27 on the freezing unit 19, or through the port 134 and line 113 to the passageway 27' on the unit 19'. In the first instance the fluid flows into the chamber 25 and cools the cells of the freezing unit 19, and is then discharged through the passage 28 and returns to the suction port 95 of the compressor through the line 112, valve port 129, rotor 131, port 132, and return line 133. When the valve rotor 127 is in its opposite position, the refrigerant in the evaporator circuit of the system passes from the expansion valve 123 through the valve ports 125 and 134, through the line 113 to the unit 19' and back to the compressor through the lines 109 and 135.

The rotors 106, 116, 126 and 131 of the multiple valve 66 act as a set of reversing valves for the refrigerating system, which when in the position shown in Figure 13 connect the freezing unit 19 into the evaporator circuit to freeze ice in the cells and the freezing unit 19' into the condenser circuit to release the ice, yet when shifted to the position of Figure 14 serve to connect the unit 19' into the evaporator circuit and the unit 19 into the condenser circuit. Thus this set of valves comprises means for alternately connecting the freezing units into the evaporating circuit or condenser circuit of the system, to alternately freeze ice in the cells and then thaw them sufficiently to free the ice. Since all of the rotors in the multiple valve 66 are on a common stem, the operation of the refrigerant valves and water supply valve are synchronized with each other to supply water to the freezing unit being cooled and to arrest the flow of water to the other unit. The closure member 31 is alternately shifted back and forth so that the unit in process of freezing is closed, while the other is opened. This action is also synchronized with the flow of water and refrigerant, since the cam 52 which operates the closure is on the same cam shaft as the cam 61 operating the multiple valve 66.

The operation of the machine is initiated by closing the line switch 92. This will energize the timer motor 45, the compressor motor 94, and the motor 122 which serves to drive the water pump 78 and the cooling fan 121. The operation of the compressor will move refrigerant through the line 101 to the heater 58 and thence through one of the freezing units 19 or 19' to the cooling coils 118 and into the liquid receiver 119. At the same time, the rotation of the timer motor 45 will cause the cam 46 to close the contacts 47 and start the first cycle of operation of the machine. Assuming that when the switch 92 is closed the parts are in the positions shown in Figure 14, the initial rotation of the motor 43 will cause the cam 48 to close the holding contacts 49 and keep the motor energized until the cam shaft 44 has rotated through one-half a revolution of movement. The notches 51 of the cam then cause the contacts 49 to open, and since the timer cam has moved sufficiently to open the contacts 47 the cam shaft will come to a stop. However, the cams 52 and 61 have moved to the positions shown in Figure 13 and will have acted through their respective linkages to shift the multiple valve and closure member 31 to the positions of Figure 13. The machine then begins to freeze ice in the freezing unit 19.

The flow of refrigerant in the evaporator circuit may be traced from the liquid receiver 119 through the expansion valve 123 and line 124 and thence through the valve ports 125 and 126 to the line 128 leading to the passageway 27 in the freezing unit 19. The refrigerant passing through the chamber 25 of this unit cools the cells 22, and the spent refrigerant passes outward through the passageway 28 and line 112 to the valve ports 129 and 132 of the multiple valve and thence to the suction port 95 of the compressor. The water to be frozen may be untreated if desired, or may be carbonated or charged with other gas. To this end the reservoir 71 may be used as a charging chamber by setting the reducing valve 76 to admit gas from the cylinder 74 into the reservoir at any desired pressure. Water is supplied to the cells of the unit by the pump 78, which draws water from the reservoir 71 and passes it through the valve ports 79 and 68 into the supply line 81 and thence through the flexible tube 82 and the inlet passage 37 to the inlet ports 38 in each of the freezing cells 22. The water is injected in a fine stream directly upward from the bottom of the cells, so that it strikes the points 24 of their top surfaces and is directed outwardly and downwardly in a thin film over the walls 23. A thin film of ice is formed on the walls, and the surplus water is drained from the cells through the drain channels 39, from which it passes through the flexible hose 85, water return line 87, and check valve 91 to the reservoir 71. The water partially cooled in the freezing unit is thus recirculated into the reservoir where it will again be exposed to the charging gas under pressure, so that the degree of gas absorption is greatly increased, and the water is passed through the freezing cells again and again until the ice deposit fills the cells. This operation of the machine is timed by the timing cam 46, and the speed of the timer motor 45 is predetermined to allow sufficient time for the ice deposit in cells 22 to be built up before the cam 46 makes a complete revolution and again closes the contacts 47. It is to be noted, however, that the ice deposit is formed in repeated or continuous freezing of thin films of ice from water flowing over the surfaces in a state of continuous active flow. Continuous recirculation of the water through the freezing chamber and thence back to the reservoir permits the water to be repeatedly exposed to the freezing temperature for a short time interval, and repeatedly recharged with gas as it passes through the reservoir.

When the timer 45 again closes the contacts 47, the motor 43 again moves the cams 52 and 61 through one-half revolution, to bring the closure member 31 and multiple valve 66 to the position shown in Figure 14. In this position the flow of refrigerant may be traced from expansion valve 23 through the line 124 and thence through the valve ports 125 and 134 to the line 113 leading to the passageway 27' in the freezing unit 19'. The refrigerant now is permitted to evaporate in the chamber 25' of this unit to cool the cells 22'. The spent refrigerant passes outwardly through the passageway 28' and lines 109 and 135, by which it is returned through the valve ports 136 and 132 to the line 133 leading to the suction port 95 of the compressor. Thus the freezing cycle is reversed, and the unit 19' is being cooled. Also, the cells 22' of the unit 19' are now closed by the closure plate 34', so that water may be introduced into the cells. Water from the pump 78 comes from the reservoir 71 and passes through the valve ports 79 and 69 through the supply line 83 and the flexible tube 84 to the inlet passage 37'. It is injected into the cells through the inlet ports 38' in the manner previously described, and the surplus water is taken from the cells through the drain channels 39', the flexible hose 85', and the water return line 88. The check valve 89 permits the water to enter the reservoir 71 where it will again be exposed to the charging of gas. The check valves 89 and 91 thus permit surplus water to be returned to the reservoir, yet prevent escape of gas through the drain lines. During this part of the cycle of the machine, the unit 19' is freezing and the cells of the unit 19 have been opened at the bottom, preparatory to releasing the cakes of ice formed in the first part of the cycle. These cakes are released by warming the walls of the cells enough to free the individual cakes, so that they will fall into the tray 41 by gravity, and slide out of the chute 42.

The cells are preferably heated by hot refrigerant taken from the condenser circuit of the system. The flow of hot refrigerant may be traced from the outlet port 96 of the compressor through the line 101 to the heater 58, and thence through the line 104 to the port 105 of the multiple valve. It passes through ports 105 and 111 of the valve, and through the line 112 to the passageway 28 of the freezing unit 19. This hot refrigerant is thus introduced into the refrigerant chamber 25 to warm the cell walls enough to release the ice. The hot fluid then flows out of the passageway 27 to the line 128 and through the valve ports 130 and 115 to the cooling coils 118 and liquid receiver 119. Thus while one of the freezing units is being refrigerated to cool the water being recirculated through its cells, the opposite unit is being warmed sufficiently to release the ice from the cells and permit the cakes to drop into the tray and pass into the delivery chute.

From the above description, it will be seen that these teachings provide a method of manufacturing individual cakes of clear carbonated or gas-charged ice from unfiltered water, and are a direct departure from the art, since the liquid being frozen is maintained in a condition of active flow over the freezing surfaces at all times. The ice is first formed as a thin film, the thickness of which progressively increases, and this method results in a product that is entirely free from the cloudy appearance heretofore ordinarily encountered. The continuously repeated cooling and charging of the water results in a product having an extremely high gas content. This is particularly desirable in carbonated ice intended for beverage purposes, since the melting of the ice will not dilute the beverage, but, instead, will release the carbonating gas into the surrounding liquid to preserve a high degree of carbonation over a long period of time.

The teachings of the invention also disclose an automatic machine to produce ice in individual portions, yet designed so that all of the water used by the machine is converted into ice. There is no waste of water. Moreover, the individual portions of ice are repeatedly frozen and are automatically released from their freezing cells and discharged through the outlet chute of the machine into any convenient receptacle. The release of the ice from the freezing cells is accomplished by the utilization of waste heat from the refrigerating system of the machine, so that power requirements are held at a minimum.

The form of the invention illustrated in the drawings and described herein is the present preferred embodiment of these teachings and is believed to be well suited to the description of the advantages to be gained thereby. It is to be recognized, however, that various deviations from the exact structure shown may be indulged in without departure from the inventive concept or sacrifice of all of the advantages thereof, and it is accordingly pointed out that the scope of the invention extends to any variations or modifications of these teachings coming within the terms of the appended claims.

Having thus described the invention, what I claim as new and desire to protect by United States Letters Patent is:

1. In an ice-making machine, the combination of at least one freezing cell having interior wall surfaces and being open at the bottom, means to open and close the bottom of the cell, means to inject liquid upwardly from the bottom of the cell, means to direct the liquid uniformly over the wall surfaces of the cell, means to refrigerate the wall surfaces of the cell to cool the liquid and form an ice deposit, means to drain excess liquid from the cell, and means to recirculate the cooled liquid through the cell until the cell is substantially filled with the ice deposit.

2. In an ice-making machine, the combination of at least one freezing cell having interior wall surfaces and being open only at the bottom; means to open and close the bottom of the cell, means to inject liquid upwardly from the bottom of the cell, means to direct the liquid uniformly over the wall surfaces of the cell, means to refrigerate the wall surfaces of the cell to cool the liquid and form an ice deposit, means to warm the interior surfaces of the cell to release the ice, and cycling means to alternately freeze and release the ice deposits.

3. In a machine for manufacturing ice, the combination, with a refrigerating system, of a pair of inverted freezing cells each having a refrigerant chamber; means for alternately closing one of said cells at its bottom and simultaneously opening the other of said cells at its bottom; means for alternately connecting the refrigerant chambers of the respective cells in the evaporator circuit of the refrigerating system to freeze ice, and means to intermittently and alternately warm the cells to release the ice.

4. In a machine for manufacturing ice, the combination with a refrigerating system including a compressor with a condenser circuit and an evaporator circuit, of a pair of inverted freezing cells each having a refrigerant chamber; a single individual swingably mounted closure member common to both freezing cells for alternately closing one of said cells at its bottom and simultaneously opening the other of said cells at its bottom; and means for alternately connecting the refrigerant chambers of the respective cells in the evaporator circuit of the refrigerating system to freeze ice or in the condenser circuit to release the ice from the cells.

5. In a machine for manufacturing ice, the combination, with a refrigerating system including a compressor with a condenser circuit and an evaporator circuit, of a pair of inverted freezing cells each having a refrigerant chamber; means for alternately closing one of said cells at its bottom and simultaneously opening the other of said cells at its bottom; means for alternately supplying liquid to be frozen to the closed one of said cells; valve means for connecting the refrigerant chambers of the respective cells in the evaporator circuit of the refrigerating system to freeze ice, or in the condenser circuit to release the ice from the cells; and means for synchronizing the operating of said closure members and valve means, whereby liquid is first frozen in one of said cells while the ice in the other cell is released, and whereby liquid is next frozen in the other of said cells while the ice in said one of said cells is freed.

6. In a machine for manufacturing ice, the combination, with a refrigerating system including a compressor with a condenser circuit and an evaporator circuit, of a pair of inverted freezing cells each having a refrigerant chamber; a single individual swingably mounted closure member common to both freezing cells for alternately closing one of said cells at its bottom and simultaneously opening the other of said cells at its bottom; supply valves for alternately supplying liquid to be frozen to the closed one of said cells and arresting the flow of liquid to the open one of said cells; means comprising flow reversing valves alternately connecting the refrigerant chambers of the respective cells in the evaporator circuit of the refrigerating system to freeze ice, or in the condenser circuit to release the ice from the cells; and control mechanism for synchronizing the operating of said closure members, supply valves, and said flow reversing valves whereby liquid is first frozen in one of said cells while the ice in the other cells is released, and whereby liquid is next frozen in the other of said cells while the ice in said one of said cells is freed.

7. In an ice-making machine, the combination of at least one inverted freezing cell having interior wall surfaces and being closed at the top and open at the bottom, a closure plate movable to and from position to close the open bottom of said cell and having a liquid passageway therein communicating with said cell through a restricted port centrally thereof, means to force a stream of liquid through said port against the closed top of said cell, means to refrigerate the wall surfaces of said cell to cool the liquid and form an ice deposit, means to drain excess liquid from the cell, and means to recirculate the cooled liquid through the cell until the cell is substantially filled with the ice deposit.

8. In an ice-making machine, the combination of at least one inverted freezing cell having interior wall surfaces and being closed at the top and open at the bottom, a closure plate movable to and from position to close the bottom of said cell and having a liquid passageway therein communicating with said cell through a restricted port, means to force a stream of liquid through said port against the closed top of said cell, means to refrigerate the wall surfaces of said cell to cool the liquid and form an ice deposit, a drain channel in said closure plate communicating with the open bottom of said cell to drain excess liquid from the cell, and means to recirculate the drained cooled liquid through the cell until the cell is substantially filled with ice deposit.

JOHN R. BAYSTON.

REFERENCES CITED

The following references are of record in the file of this patent:

UNITED STATES PATENTS

| Number | Name | Date |
| --- | --- | --- |
| 1,478,863 | Stewart | Dec. 25, 1923 |
| 1,721,312 | Muenchen | July 16, 1927 |
| 2,221,212 | Wussow et al. | Nov. 12, 1940 |
| 2,239,234 | Kubaugh | Apr. 12, 1941 |
| 2,240,769 | Glazer | May 6, 1941 |
| 2,340,721 | Whitney | Feb. 1, 1944 |

FOREIGN PATENTS

| Number | Country | Date |
| --- | --- | --- |
| 798,523 | France | Mar. 10, 1936 |